United States Patent
Moody, III et al.

(10) Patent No.: US 11,475,327 B2
(45) Date of Patent: Oct. 18, 2022

(54) APPARATUS AND METHOD FOR MULTIVARIATE PREDICTION OF CONTACT CENTER METRICS USING MACHINE LEARNING

(71) Applicant: SWAMPFOX TECHNOLOGIES, INC., Columbia, SC (US)

(72) Inventors: David Jesse Moody, III, Chapin, SC (US); Nathan Pocta, Cary, NC (US); Sergey A. Razin, Columbia, SC (US)

(73) Assignee: Swampfox Technologies, Inc., Columbia, SC (US)

(*) Notice: Subject to any disclaimer, the term of this patent is extended or adjusted under 35 U.S.C. 154(b) by 338 days.

(21) Appl. No.: 16/817,393

(22) Filed: Mar. 12, 2020

(65) Prior Publication Data
US 2020/0293922 A1     Sep. 17, 2020

Related U.S. Application Data

(60) Provisional application No. 62/817,221, filed on Mar. 12, 2019.

(51) Int. Cl.
*G06F 17/00* (2019.01)
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
USPC ........................................................ 706/12, 21
See application file for complete search history.

(56) References Cited

U.S. PATENT DOCUMENTS

| | | | | |
|---|---|---|---|---|
| 1,176,461 | A * | 3/1916 | Kelso | D05B 35/10 112/128 |
| 7,725,339 | B1 * | 5/2010 | Aykin | G06Q 10/10 705/7.14 |
| 9,894,205 | B1 * | 2/2018 | Miller | H04M 3/5158 |
| 10,931,825 | B2 * | 2/2021 | Revanur | H04M 3/5175 |
| 11,087,880 | B1 * | 8/2021 | Shah | G16H 50/20 |
| 2008/0205611 | A1 * | 8/2008 | Jordan | H04M 3/5232 379/112.04 |
| 2015/0195406 | A1 * | 7/2015 | Dwyer | G06F 40/279 379/265.07 |
| 2016/0295019 | A1 * | 10/2016 | O'Connor | H04M 3/5175 |
| 2017/0293844 | A1 * | 10/2017 | Gombolay | G06N 7/005 |
| 2018/0034966 | A1 * | 2/2018 | te Booij | H04M 3/5232 |
| 2018/0101529 | A1 * | 4/2018 | Karpistsenko | G06F 16/1873 |
| 2018/0300621 | A1 * | 10/2018 | Shah | G06N 3/08 |

(Continued)

*Primary Examiner* — William J Deane, Jr.
(74) *Attorney, Agent, or Firm* — Duquette Law Group (57) ABSTRACT

In a predictor device, a method for predicting a metric of a contact center includes receiving contact center operational data associated with a time duration; training a set of algorithms and their available hyperparameters with the contact center operational data to generate a set of data models; generating a score associated with each data model of the set of data models, the score quantifying a performance of each algorithm and its available hyperparameters on the contact center operational data; identifying the data model having the largest score as a best learning model for the time duration; and generating a contact center metric prediction based on the best learning model for the time duration.

22 Claims, 7 Drawing Sheets

(56) References Cited

U.S. PATENT DOCUMENTS

| | | | |
|---|---|---|---|
| 2019/0147354 A1* | 5/2019 | Gao | G06N 5/003 |
| | | | 706/11 |
| 2020/0137231 A1* | 4/2020 | Revanur | H04M 3/5175 |
| 2020/0202212 A1* | 6/2020 | Harada | G06N 3/08 |
| 2020/0334615 A1* | 10/2020 | Benjamin | G06Q 10/063114 |
| 2020/0380378 A1* | 12/2020 | Moharrer | G06N 20/00 |
| 2020/0403944 A1* | 12/2020 | Joshi | G06F 9/547 |
| 2021/0182660 A1* | 6/2021 | Amirguliyev | G06N 3/0454 |
| 2021/0216366 A1* | 7/2021 | Katz | G06F 9/5038 |

* cited by examiner

APPARATUS AND METHOD FOR MULTIVARIATE PREDICTION OF CONTACT CENTER METRICS USING MACHINE LEARNING

RELATED APPLICATIONS

This patent application claims the benefit of U.S. Provisional Application No. 62/817,221, filed on Mar. 12, 2019, entitled, "Apparatus and Method for Multivariate Prediction of Contact Center Metrics Using," the contents and teachings of which are hereby incorporated by reference in their entirety.

BACKGROUND

In conventional customer contact centers, incoming communications, such as voice calls or texts for example, can be received and answered by an agent pool. During operation, the contact center can automatically distribute and connect incoming communications to available agents or to agents best suited to handle the communications. In the case where no suitable agents are available, the customer contact center can become overloaded and can place the communications in a variety of queues based upon some pre-established criteria, such as based on the order of arrival and/or priority.

One of the priorities of a contact center is to be predictive of its load, which allows for better planning and scheduling of the resources available. Another priority of the contact center is to accurately set expectations with the customer and deliver on those established expectations once set. Setting and delivering on the established expectations closely relates to customer experience as well as service levels.

Both of these priorities can be achieved by applying machine learning algorithms to a variety of contact center operational data such as agent staffing, call arrival rate, call handling rate, and seasonality, for example. Such an approach can provide the ability for the contact center to provide a metric known as estimated wait time (EWT). The estimated wait time can identify an amount of time a customer is estimated to wait before being serviced by an agent. Based upon application of a variety of machine learning algorithms and their corresponding hyperparameters to contact center operational data, the contact center EWT can be derived which, in turn, can be used to identify the appropriate number of agents to be staffed by the contact center, as well as to set the expectation with the customer by reporting or acting within the estimated wait time. The EWT can also be utilized to identify where callers should be routed in the contact center (e.g., by placing the callers in a queue with the lowest wait time).

SUMMARY

The success of any contact center is based upon the accuracy of the EWT estimation. For example, based upon the EWT estimation, the customer contact center can make decisions to efficiently route calls or to determine whether or not an offer for a callback should be placed. The accuracy of the EWT depends upon the accuracy of the conventional contact center's statistics, since traditional statistical rules and heuristics are utilized to produce accurate EWTs. However, the process of producing these EWTs can suffer from a variety of deficiencies.

For example, accuracy of the EWT can decrease when the customer contact center is overloaded or unstable. Further, contact center metrics can experience a high variance, such as those based on seasonality, as well as unexpected and expected events, such as power outages and holidays. Such variance can influence the contact center's statistics and resulting EWT estimates. Additionally, the statistics related to a contact center's operation can change over time. While a customer contact center may be manually optimized for a given time frame, the contact centers can evolve and change over time as the customers' needs change. Therefore, an accurate EWT for one time period may not be considered accurate for a later period.

By contrast to conventional detection of contact center metrics, embodiments of the present innovation relate to an apparatus and method for multivariate prediction of contact center metrics, such as EWT, using machine learning. In one arrangement, a predictor device includes a Learner of Learners engine configured to utilize available contact center operational data to derive a best learning model for a given time period or season based upon a variety of machine learning algorithms trained with available hyperparameters. After having identified a best learning model, the predictor device can utilize the best learning model to predict a given contact center metric, such as estimated wait time, for the contact center for the given time period. By using a Learner of Learners approach, the predictor device can automatically determine the best model to predict a contact center metric, such as EWT, based on its performance. Further, the predictor device makes the modelling process efficient and adaptive, thereby mitigating or eliminating manual steps and heuristics during operation while adapting to the variance and instability typically found in conventional contact centers.

In one arrangement, the predictor device also includes a Predictor of Predictors engine configured to account for short-term fluctuations in the contact center operational data received from the contact center. The Predictor of Predictors engine is configured to apply updated contact center operational data to the previous best learning models generated by the Learner of Learners engine. Further, the Predictor of Predictors engine can weigh the previous best learning models which allows the Predictor of Predictors engine to identify the best model to use when predicting contact center metrics (e.g., estimated wait times). As such, the Predictor of Predictors engine can account for seasonality while applying multivariate prediction to the updated contact center operational data based on previously trained hyperparameters and algorithms.

Further, in one arrangement, the predictor device is configured to apply quality metrics to the models to ensure the use of the most accurate model during operation. For example, the predictor device can apply training quality metrics to a set of data models to identify the best learning model. The predictor device can also apply training quality metrics to a currently-deployed best learning model to evaluate its quality during use. In the case where the predictor device identifies a deviation in operation of the best learning model between a prediction data set and a training data set, the predictor device can be configured to retrain the best learning model or to select an alternate model as the best learning model for deployment.

In one arrangement, embodiments of the innovation relate to, in a predictor device, a method for predicting a metric of a contact center. The method includes receiving contact center operational data associated with a time duration; training a set of algorithms and their available hyperparameters with the contact center operational data to generate a set of data models; generating a score associated with each data model of the set of data models, the score quantifying a performance of each algorithm and its available hyperparameters on the contact center operational data; identifying the data model having the largest score as a best learning model for the time duration; and generating a contact center metric prediction based on the best learning model for the time duration.

In addition, this method includes continually and automatically performing partial training on the real-time contact center operational data in order to keep data models up-to-date while mitigating or eliminating expansive full data training operations.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to an apparatus and method for multivariate prediction of contact center metrics, such as EWT, using machine learning. In one arrangement, a predictor device includes a Learner of Learners engine configured to utilize available contact center operational data to derive a best learning model for a given time period or season using a variety of machine learning algorithms trained with available hyperparameters. After having identified a best learning model, the predictor device can utilize the best learning model to predict a given contact center metric, such as estimated wait time, for the contact center for the given time period. By using a Learner of Learners approach, the predictor device can automatically determine the best model to predict a contact center metric, such as EWT, based on its performance. Further, the predictor device makes the modelling process efficient and adaptive, thereby mitigating or eliminating manual steps and heuristics during operation while adapting to the variance and instability typically found in conventional contact centers.

In one arrangement, the predictor device also includes a Predictor of Predictors engine configured to account for short-term fluctuations in the contact center operational data received from the contact center. The Predictor of Predictors engine is configured to apply updated contact center operational data to the previous best learning models generated by the Learner of Learners engine. Further, the Predictor of Predictors engine can weigh the previous best learning models which allows the Predictor of Predictors engine to identify the best model to use when predicting contact center metrics (e.g., estimated wait times) for a contact center. As such, the Predictor of Predictors engine can account for seasonality while applying multivariate prediction to the updated contact center operational data based on previously trained hyperparameters and algorithms.

In one arrangement, the predictor device is configured to apply quality metrics to the models to ensure the use of the most accurate model during operation. For example, the predictor device can apply training quality metrics to a set of data models to identify the best learning model. The predictor device can also apply training quality metrics to a currently-deployed best learning model to evaluate its quality during use. In the case where the predictor device identifies a deviation in operation of the best learning model between a prediction data set and a training data set, the predictor device is configured to retrain the best learning model or to select an alternate model as the best learning model for deployment.

Figure 1:
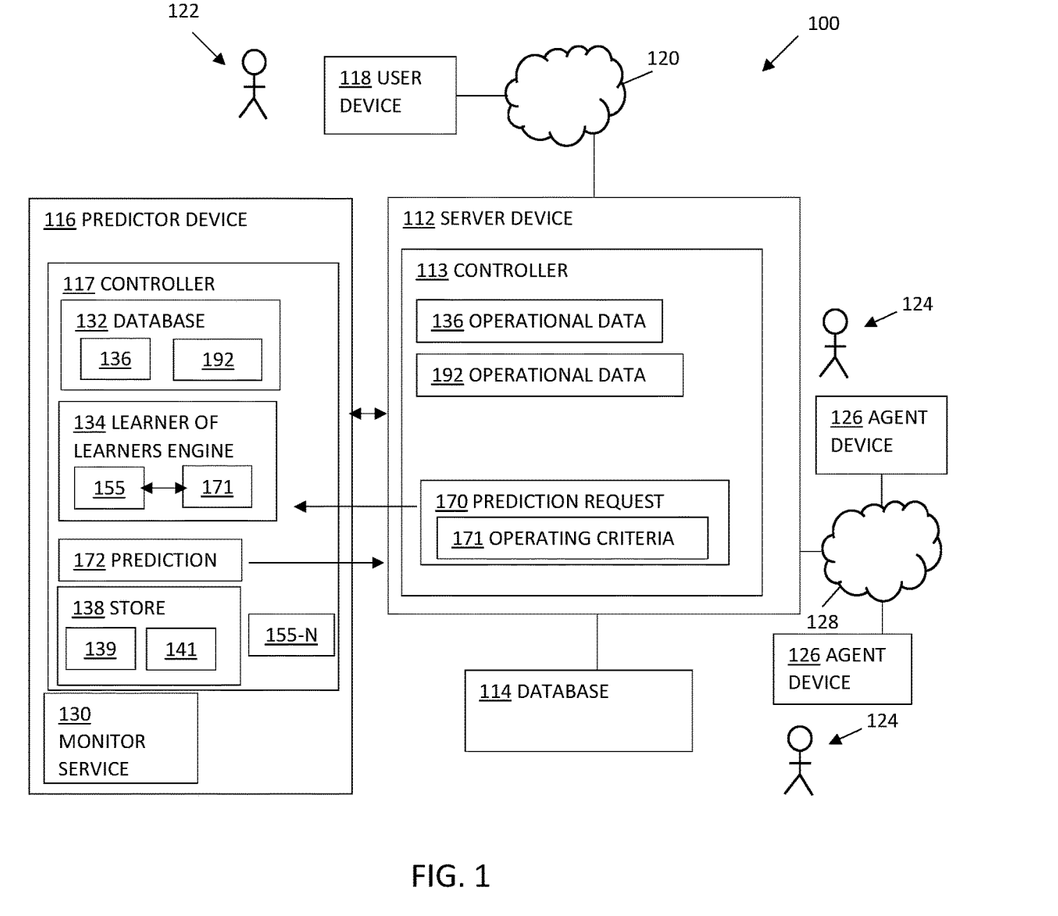
FIG. 1 illustrates a schematic representation of a contact center, according to one arrangement.

FIG. 1 illustrates a schematic representation of a contact center 100, according to one arrangement. The contact center 100 can include a server device 112 disposed in electrical communication with one or more data stores or databases 114 and a predictor device 116 disposed in electrical communication with the server device 112.

The server device 112 can be a computerized device having a controller 113, such as a processor and memory. According to one arrangement, server device 112 is disposed in electrical communication with a user device 118, such as a telephone, smartphone, or tablet device, via a network 120, such as a local area network (LAN), a wide area network (WAN), or a public switched telephone network (PSTN). During operation, the server device 112 is configured to direct a user 122 of the user device 118, or customer, to an appropriate working agent 124. Each working agent 124 can operate a corresponding computer work station 126, such as a personal computer, telephone, tablet device or other type of voice communications equipment, all interconnected by a network 128, such as a LAN or WAN 128. Also during operation, the server device 112 can store information regarding the user communication to the database 114. For example, server device 112 can store contact or customer related information for each communication session, as well as other information that can enhance the value and efficiency of the contact information.

The predictor device 116 can be a computerized device having a controller 117, such as a processor and memory. The predictor device 116 is configured to identify and self-optimize statistical models based upon the application of a variety of algorithms and available hyperparameters to contact center operational data received from the server device 112, thereby reducing the need for human involvement. As will be described below, the predictor device 116 can adjust for seasonality associated with the contact center operational data while still training on updated contact center operational data in a relatively fast manner.

Figure 2:
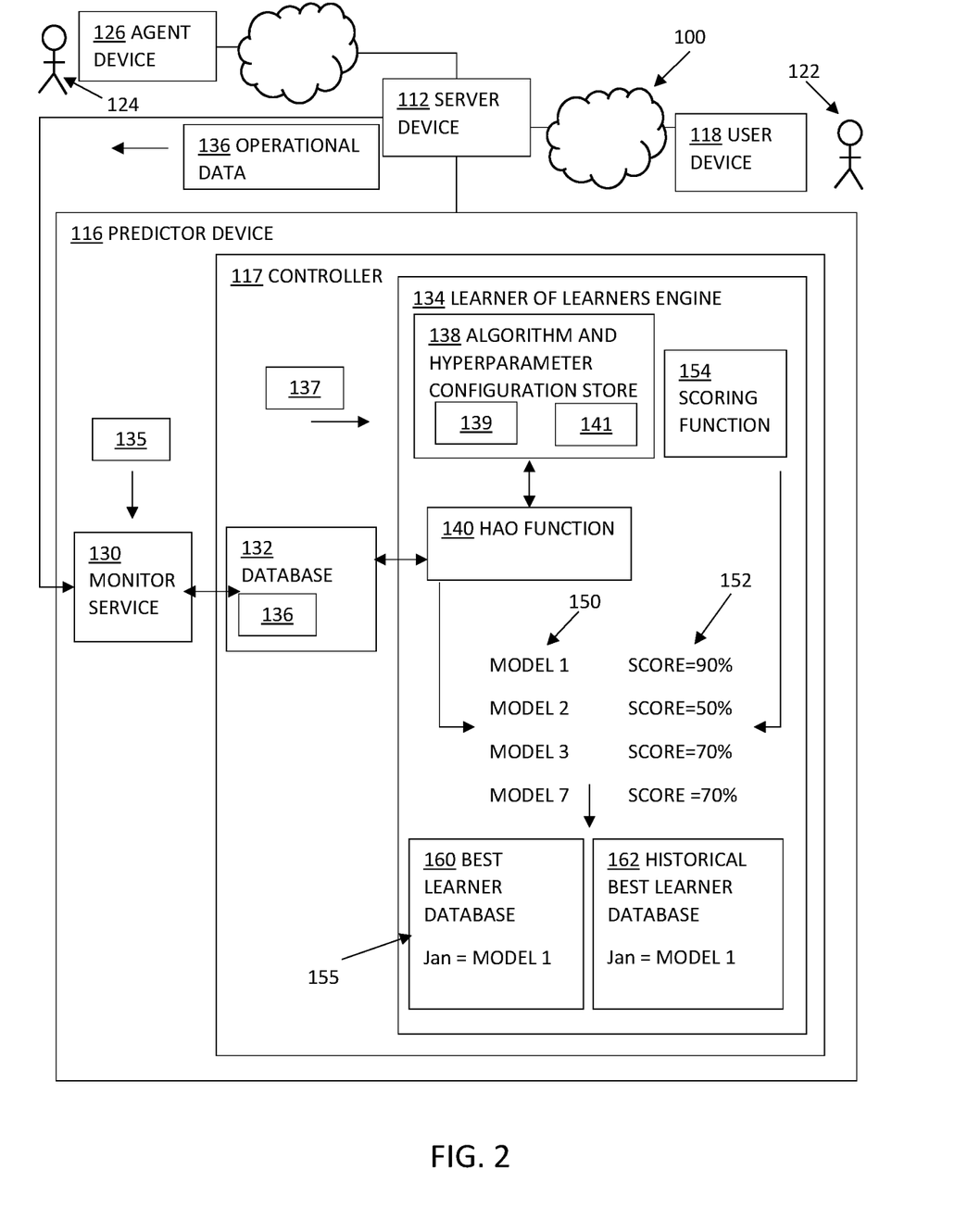
FIG. 2 illustrates a schematic representation of a predictor device of the contact center of FIG. 1, according to one arrangement.

As illustrated in FIG. 2, the controller 117, associated contact center operations data 136 stored in database 132, etc., are all deployed on a single computerized device (i.e., the predictor device 116). Such illustration is by way of example only. In one arrangement, deployment models of the present innovation are flexible and can be deployed and scaled across multiple computerize devices.

With reference to FIG. 2, the predictor device 116 includes a monitoring service 130, a database 132, and a Learner of Learners (LOL) engine 134. The monitoring service 130 is configured to retrieve contact center operational data 136 from the server device 112. For example, during operation, the server device 112 can route or direct users 122 to appropriate working agents 124. As such, the contact center operational data 136 can relate to information associated with communication routing within the contact center 100 for a given period of time. As the monitoring service 130 receives the contact center operational data 136, the monitoring service 130 stores the data 136 to the database 132 for use by the LOL engine 134.

In one arrangement, the LOL engine 134 can include an algorithm and associated hyperparameter configuration store 138. The store 138 can include an algorithm reference list 139 and a hyperparameter options list 141 which can identify any number of algorithms and available hyperparameters. In one arrangement, the algorithms are configured as regression algorithms. For example, the LOL engine 134 can include, as a first algorithm in the algorithm reference list 139, a neural network algorithm having a variety of available hyperparameters identified in the hyperparameter options list 141. For example, the neural network algorithm can have available hyperparameters related to hidden layer size and available hyperparameters related to learning rate. Further, the LOL engine 134 can include, as a second algorithm in the algorithm reference list 139, a decision tree algorithm having a variety of available hyperparameters identified in the hyperparameter options list 141. For example, the decision tree algorithm can have available hyperparameters related to maximum tree depth. While the store 138 can be preconfigured with an algorithm reference list 139 and a hyperparameter options list 141, in one arrangement, the store 138 can receive additional algorithms and hyperparameters from an external source and/or have algorithms and available hyperparameters within the lists 139, 141 adjusted or deleted by an external source.

The LOL engine 134 is configured to execute a hyperparameter and algorithm optimization (HAO) function 140 to utilize the available contact center operational data 136 from the database 132 to train a set of algorithms and their available hyperparameters to generate data models. As provided below, following the training, the LOL engine 134 can determine a best learning model of the data models for a given time period.

Figure 3:
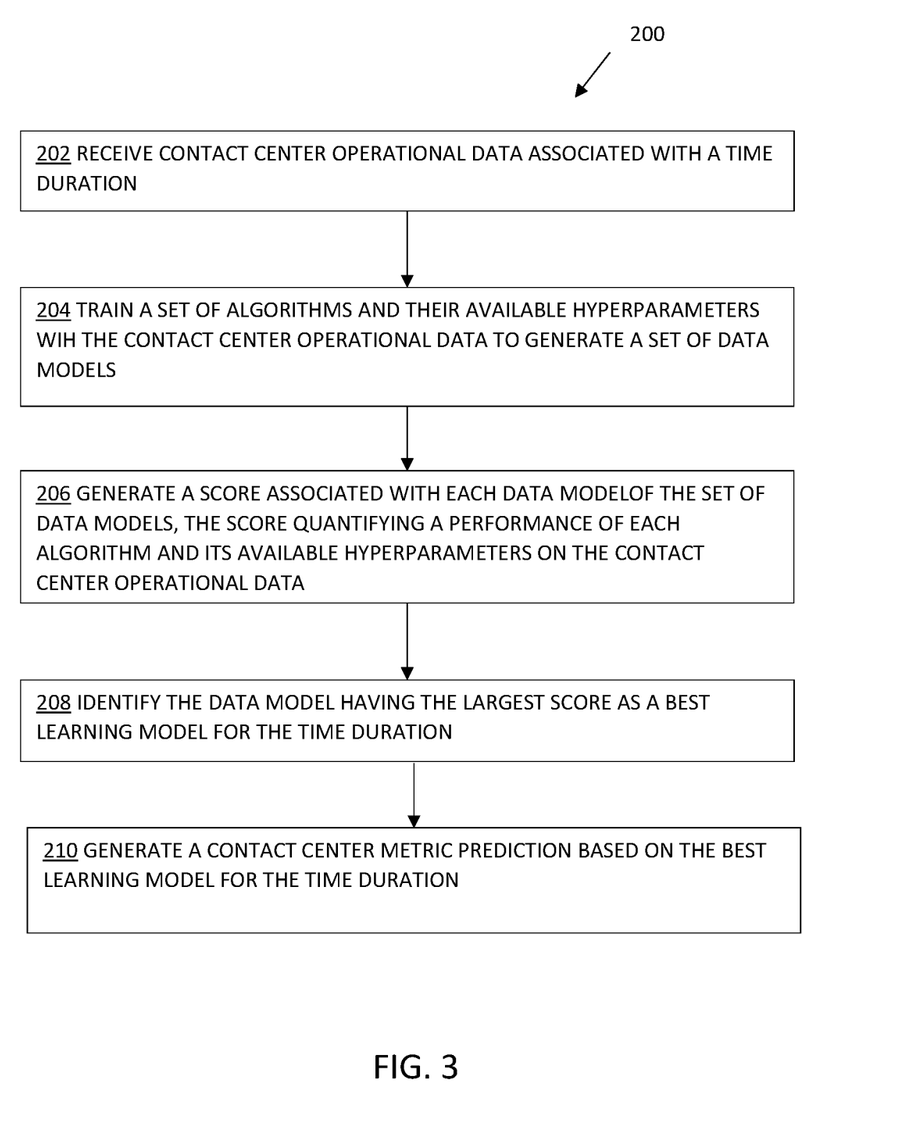
FIG. 3 illustrates a flowchart showing a process performed by the predictor device of FIG. 2, according to one arrangement.

FIG. 3 illustrates a flowchart 200 of a process performed by the predictor device 116 when predicting a metric of a contact center 100, as based upon the determination of a best learning model for a given time period.

During operation, in step 202, the predictor device 116 receives contact center operational data 136 associated with a time duration. For example, with reference to FIG. 2, the predictor device 116 provides API call instructions 135 to the monitor service 130 which directs the monitor service 130 to retrieve contact center operational data 136 from the server device 112 for a particular time period, such as for a given month (e.g., the month of January). The monitor service 130 can store the retrieved contact center operational data 136 within database 132.

In one arrangement, the predictor device 116 also provides an API call 137 to the LOL engine 134. The API call 137 causes the LOL engine 134 to access the algorithm and associated hyperparameter configuration store 138 and retrieve the algorithms from the reference list 139 and associated parameters from the options list 141 to be trained on the contact center operational data 136. The store 138 can include the algorithm reference list 139 and the hyperparameter options list 141 which can identify any number of algorithms and available hyperparameters. For example, assume the case where the algorithm and associated hyperparameter configuration store 138 references a linear regression algorithm and a neural network algorithm having two available hyperparameters: a first hyperparameter identifying the neural network as having 3 layers with 200 nodes and a second hyperparameter identifying the neural network as having 2 layers and 50 nodes. In this case, the LOL engine 134 can retrieve both algorithms, as well as both of the hyperparameters associated with the second algorithm.

Further, the API call 137 to the LOL engine 134 can cause the LOL engine 134 to access the database 132 to retrieve the contact center operational data 136 for a particular time period. For example, in response to the API call, the LOL engine 134 can retrieve, as the contact center operational data 136, communication routing information within the contact center 100 for the month of January.

In one arrangement, the LOL engine 134 is configured to normalize the contact center operational data 136 retrieved from the database 132. For example, the contact center operational data 136 can include communication routing information having a variety of time scales. For example, the communication routing information can be presented in seconds (s) or milliseconds (ms). In such an example, the LOL engine 134 is configured to format the contact center operational data 136 to a common time scale.

Returning to FIG. 3, at step 204, the predictor device 116 is configured to train a set of algorithms and their available hyperparameters with the contact center operational data 136 to generate a set of data models 150. In one arrangement, with reference to FIG. 2, the LOL engine 134 can execute the hyperparameter and algorithm optimization function 140 to apply the contact center operational data 136 to each of the algorithms and hyperparameters to generate a data model 150 associated with each algorithm and hyperparameter case.

For example, assume the store 138 includes an algorithm reference list 139 and a hyperparameter options list 141 that identify the following algorithms and hyperparameters:
Algorithm 1: Neural Network
Hyperparameters:
    Hidden Layer Size—[100, 50]
    Learning Rate—[1,2]
Algorithm 2: Decision Tree
Hyperparameters:
    Maximum Tree Depth—[1,2,3]
By applying the contact center operational data 136 to each of the algorithms and hyperparameters, the LOL engine 134 can generate the following set of data models 150:

| Algorithm | Hyperparameter Set | Model |
|---|---|---|
| 1 | 100, 1 | Model 1 |
| 1 | 50, 1 | Model 2 |
| 1 | 100, 2 | Model 3 |
| 1 | 50, 2 | Model 4 |
| 2 | 1 | Model 5 |
| 2 | 2 | Model 6 |
| 2 | 3 | Model 7 |

Returning to FIG. 3, at step 206, the predictor device 116 is configured to generate a score 152 associated with each data model of the set of data models 150 where the score 152 quantifies a performance of each algorithm and available hyperparameters on the contact center operational data 136. Typically, following the generation of a machine learning model, the model can be quantitatively evaluated using a variety of scoring methods to indicate how well the model performs. In one arrangement, with reference to FIG. 2, the LOL engine 134 can apply a scoring function 154 to each of the data models 150 in order to generate corresponding scores 152 identifying the performance of each. For example, in the above case, assume the application of the scoring function 154 to each of the data models 150 results in the following scores:

| Model | Score |
|---|---|
| Model 1 | 90% |
| Model 2 | 50% |
| Model 3 | 70% |
| Model 4 | 80% |
| Model 5 | 55% |
| Model 6 | 60% |
| Model 7 | 70% |

Returning to FIG. 3, at step 208, the predictor device 116 is configured to identify the data model 150 having the largest score as a best learning model 155 for the time duration. For example, based upon an inter-comparison of each score, the predictor device 116 can identify Model 1 (i.e., neural network with a hidden layer size of 100, and a learning rate of 1) as having the largest score (90%) of the set of models 150 for a given time period, in this case the month of January. As such, the predictor device 116 can identify Model 1 as being the best learning model 155 for the set of models 150.

With continued reference to FIG. 3, in step 210, the predictor device 116 is configured to generate a contact center metric prediction 172 based on the best learning model 155 for the time duration. With the development of the best learning model 155, the predictor device 116 can utilize the best learning model 155 to assist the server device 112 of the contact center 100 with the development of a variety contact center metrics 172, such as estimated wait times.

In one arrangement, with reference to FIG. 1, following development of the best learning model 155, the server device 112 can generate and transmit a prediction request 170 for an operating condition, such as an estimated wait time (EWT), associated with the contact center 100. The prediction request 170 can include particular conditions or operating criteria 171 which relate to the contact center 100, such as queue size, number of working agents 124, and time frame (e.g., 10 AM to 10 PM), for a given time period (e.g., February).

In response to receipt of the prediction request 170, the predictor device 116 can extract the operating criteria 171 from the request 170 and can apply the operating criteria 171 to the best learning model 155 for the time period identified in the request 170 (e.g., February). By applying the operating criteria 171 to the best learning model 155 for the given time period, the predictor device 116 can generate a contact center metric prediction 172, such as estimated wait time associated with the contact center 100. The predictor device 116 can then forward the contact center metric prediction 172 within the contact center 100, such as to the server device 112. The server device 112, in turn, can utilize the contact center metric prediction 172 to determine how to address the users 122 and the associated wait times within the contact center 100.

As provided above, the predictor device 116 is configured to generate a best learning model 155 for a given time period associated with the contact center 100. Following generation of the best learning model 155, the predictor device 116 can store the best learning model 155 in a variety of types of databases.

In one arrangement, with reference to FIG. 2, the LOL engine 134 of the predictor device 116 can include a best learner database 160. In one arrangement, the best learner database 160 can store the data model 150 having the largest score, in this case the best learning model 155 within the best learner database 160. During operation, as the LOL engine 134 repeats the modelling process for subsequent time periods, as will be described below, the LOL engine 134 can add to the best learner database 160 to include best learning models 155 having the largest score for subsequent time periods (e.g., subsequent months). As such, the predictor device 116 can save the model 155, and associated algorithm, with the best scoring function for posterity and future predictions.

In one arrangement, the LOL engine 134 of the predictor device 116 can include a historical best learner database 162 which is configured to store the model 155 having the largest overall score for an extended time period. For example, as the LOL engine 134 repeats the modelling process for subsequent time periods (e.g., for subsequent months), the engine 134 can compare the highest score of the model for each subsequent time period with the score of the model stored in the historical best learner database 162. In the case where the score of the model for a successive time period is greater than the score of the model stored in the historical best database 162, the LOL engine 134 can update the historical best learner database 162 to replace the currently-stored model with the model 155 from the successive time period having the higher score.

As indicated above, the predictor device 116 can repeat the process of determining a best learning model 155 for subsequent time periods, such as for subsequent months. For example, with reference to FIG. 1, the monitor service 130 of the predictor device 116 can be configured to retrieve updated contact center operational data 192 from the contact center 100 on a monthly basis for subsequent time durations (e.g., February, March, etc.). With receipt of the updated contact center operational data 192, the predictor device 116 can access the algorithm and associated hyperparameter configuration store 138 which includes the algorithm reference list 139 and hyperparameter options list 141 and can train the algorithms and their available hyperparameters provided in the lists 138, 139 with the updated contact center operational data 192. As a result of the training, the predictor device 116 can generate a set of subsequent data models 155-N for the subsequent time duration. Similar to the process described above, following generation of the set of subsequent data models 155-N, the predictor device 116 is configured to generate a score associated with each subsequent data model of the set of subsequent data models which quantifies the performance of each algorithm and its available hyperparameters on the contact center operational data 192 for the subsequent time duration. The predictor device 116 can then identify the subsequent data model having the largest score as the subsequent best learning model for the subsequent time duration.

Over time, the predictor device 116 can add a best learning model 155 to the best learner database 160 for each subsequent time duration, such as for subsequent months. As such, the predictor device 116 can develop models 155 that account for the changes in the behavior of the contact center 100 over the course of a year. For example, the models 155 contained in the historical best database 160 can identify the contact center 100 as being exceedingly busy in January and February and less busy in July and August of a particular year.

As provided above, following identification of a data model having the largest score as the best learning model 115, the predictor device 116 can store the best learning models 155 within a best learner database 160. In one arrangement, to account for seasonality, the predictor device 116 is configured to store two versions of the best learning model 155 within the best learner database 160. For example, with reference to FIG. 4, the best learner database 160 includes a best learner training portion 180 and a best learner pristine portion 182.

Figure 4:
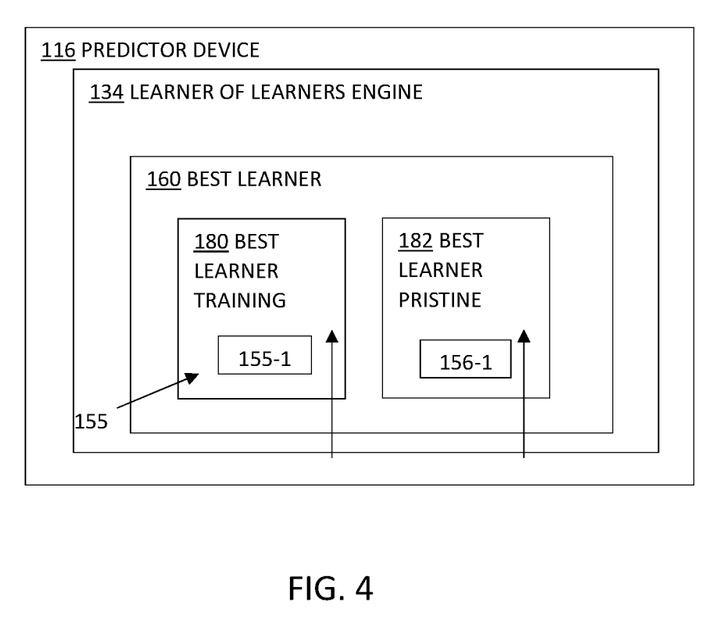
FIG. 4 illustrates a schematic representation of a best learner database, according to one arrangement.

The best learner training portion 180 stores a copy of the best learning model 155 which the predictor device 116 can continue to train. By storing a copy of the best learning model 155 within the best learner training portion 180, the predictor device 116 can maintain a relatively long, historical trend of previously well-functioning models. As such, seasonality of the best learning model information can be achieved by the predictor device 116.

The best learner pristine portion 182 stores a copy 156 of the best learning model 155 which the predictor device 116 maintains in an unchanged or pristine state after its period of being the best learner. By storing a copy 156 of the best learning model 155 within the best learner pristine portion 182, the predictor device 116 allows previously utilized best learning model 155 to be re-used at a later time if it had functioned well previously. For example, the copy 156-1 of the best learning model 155-1 for the month of December, which is stored within the best learner pristine portion 182, will remain unchanged by the predictor device 116 in light of updated contact center operational data 136 received in subsequent months. As such, the best learner pristine portion 182 of the best learner database 160 will contain, and have available, a version 156-1 of the best learning model 155-1 that has only been trained during December. As the year progresses, when the following December arrives, the predictor device 116 can access and utilize the copy 156-1 of the best learning model 155-1 for the previous month of December.

As provided above, the LOL engine 134 can be configured to execute a hyperparameter and algorithm optimization function 140 to utilize the available contact center operational data 136 from the database 132 to train a set of algorithms and their available hyperparameters. However, since the LOL engine typically develops thousands of models for a given time period during the training of the algorithms and available hyperparameters with the contact center operational data 136, operation of the LOL engine 134 can be considered to be relatively slow. Accordingly, the predictor device 116 can be configured to execute the LOL engine 134 periodically during relatively large time intervals (e.g., weekly, monthly, etc.) which can cause updated contact center operational data 136 to age and potentially become unusable (e.g., stale) over those large intervals.

Figure 5:
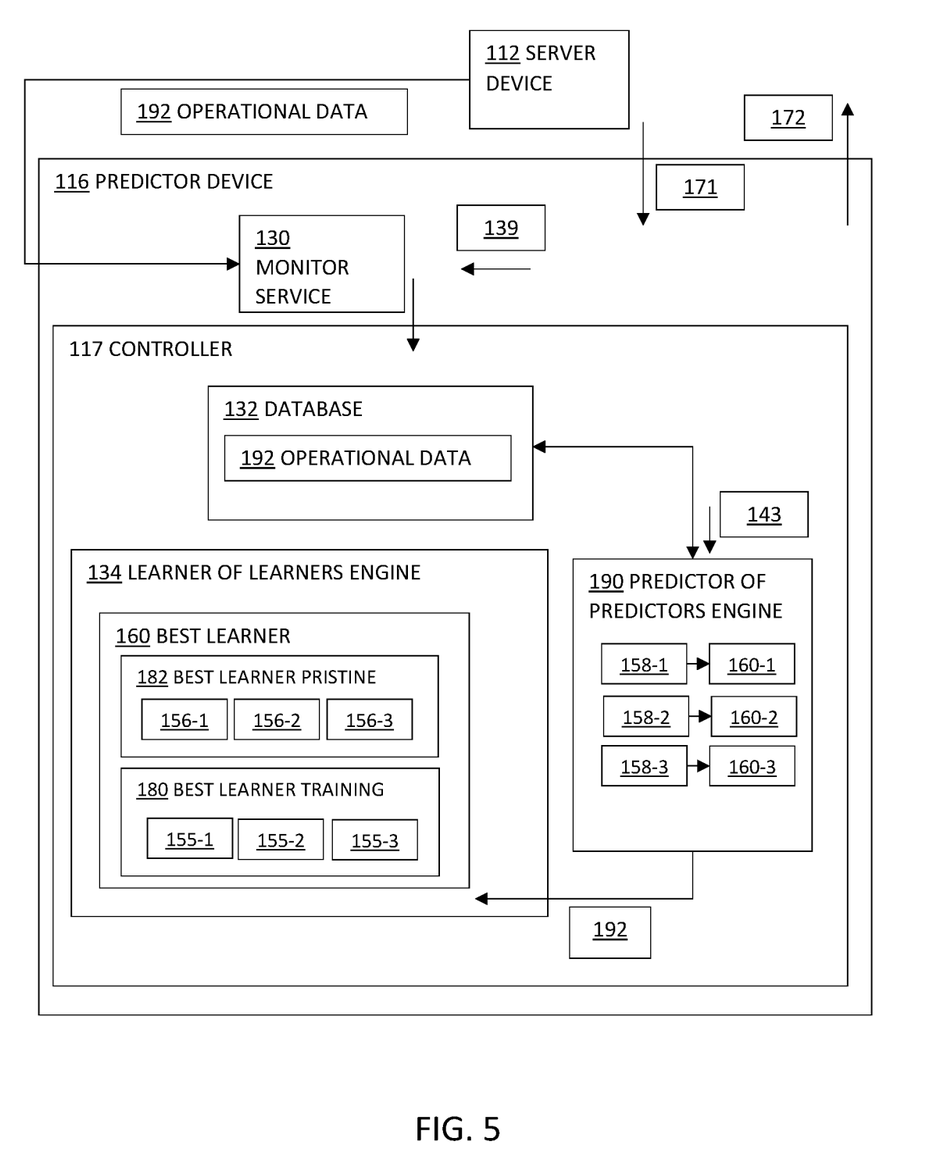
FIG. 5 illustrates a schematic representation of the predictor device of FIG. 2 having a predictor of predictors engine, according to one arrangement.

In order to utilize updated contact center operational data 136 during relatively shorter time periods, in one arrangement and with reference to FIG. 5, the predictor device 116 can be configured to execute a Predictor of Predictors (POP) training engine 190. The POP engine 190 provides a relatively quicker training approach, relative to the LOL engine 134, which mitigates the contact center operational data 136 from going stale and accounts for short-term fluctuations contact center operational data 136 received from the server device 112.

FIG. 5 illustrates a predictor device 116 having an LOL engine 134 and a POP engine 190. The POP engine 190 is configured to receive updated contact center operational data 192 and to train the previous best learning models 155, as stored by the predictor device 116 in the best learner training portion 180 of the database 160, on the contact center operational data 192. Since different algorithms may perform better at different times, the POP engine 190 can weigh the previous best learning models 155 to identify the best algorithms to use when generating contact center metric predictions 172 (e.g., estimated wait times) for the contact center 100.

During operation, the predictor device 116 receives the updated contact center operational data 192 from the contact center 100 for a time duration. For example, the predictor device 116 provides API call instructions 139 which directs the monitor service 130 to retrieve updated contact center operational data 192 from the server device 112. In the case where the predictor device 116 detects the transmission of a previous API call to the LOL engine 134, the predictor device 116 further provides an API call 143 to the POP engine 190. This API call 143 causes the POP engine 190 to access the best learner training portion 180 of the best learner database 160.

After accessing the best learner training portion 180, the POP engine 190 is configured to partially train the current or most-recent best learning model 155 stored within the best learner database 160 on the updated contact center operational data 192 and to partially train each of the best learning models previously stored within the best learner database 160 on the updated contact center operational data 192. For example, in the case where the best learner database 160 includes a best learning model 155-3 for the month of February, a best learning model 155-2 for the month of January, and best learning model 155-1 for the month of December, the POP engine 190 can use the updated contact center operational data 192 to train the most recent best learning model 155-3 (February) and the previous best learning models 155-2, 155-1 (January and December). In the process of partial training, the POP engine 190 can access each previously constructed model 155-1 through 155-3 along with and the pre-trained weights for each model 155-1 through 155-3. The POP engine 190 can then hold the pre-trained weights constant up to the final layer of each of the models 155-1 through 155-3. As the POP engine 190 trains the models 155 155-1 through 155-3 on the updated contact center operational data 192, the POP engine 190 allows the weights in final layer to change. As a result of the partial training, the POP engine 190 can generate trained best learning models 158-1, 158-2, and 158-3, respectively.

Following the partial training, the POP engine 190 can weigh the trained best learning model 158-1 through 158-3 for each month with the pristine model 156-1 through 156-3 for that month, as stored in the best learner pristine portion 182 of the database 160 (i.e., with a minimum weighting given to the current best predictor) to generate an associated accuracy score 160 for each. For example, based on the weighing process, the POP engine 190 can generate various accuracy scores, such as a 98% accuracy score 160-3 for the best learning model 158-3 of February, a 90% accuracy score 160-2 for the trained best learning model 158-2 of January, and a 95% accuracy score 160-1 for the trained best learning model 158-1 of December.

Further, in response to receiving contact center operation criteria 171 from the server device 112, such as queue size, number of working agents 124, and time frame (e.g., 10 AM to 10 PM), for a given time period (e.g., February), the predictor device 116 can apply the trained best learning model 158 having the highest accuracy score to the contact center operation criteria 171 to generate a contact center metric prediction 172 for the contact center 100. Using the above scores as an example, the POP engine 190 can identify the trained best learning model 158-3 of February as having the highest accuracy score and, as such, the appropriate model to use when generating the prediction 172 (e.g., estimated wait time) for the contact center 100 at that time.

As provided above, following the generation of a set of data models 150, the predictor device 116 is configured to generate a score 152 which quantifies the accuracy or quality for each model 150 during training. While the predictor device 116 can generate the scores 152 in a variety of ways, in one arrangement and with reference to FIG. 6, the predictor device 116 is configured to utilize at least one training quality metric 250 to generate the score 152 and to allow assessment of the accuracy of each model 150.

Figure 6:
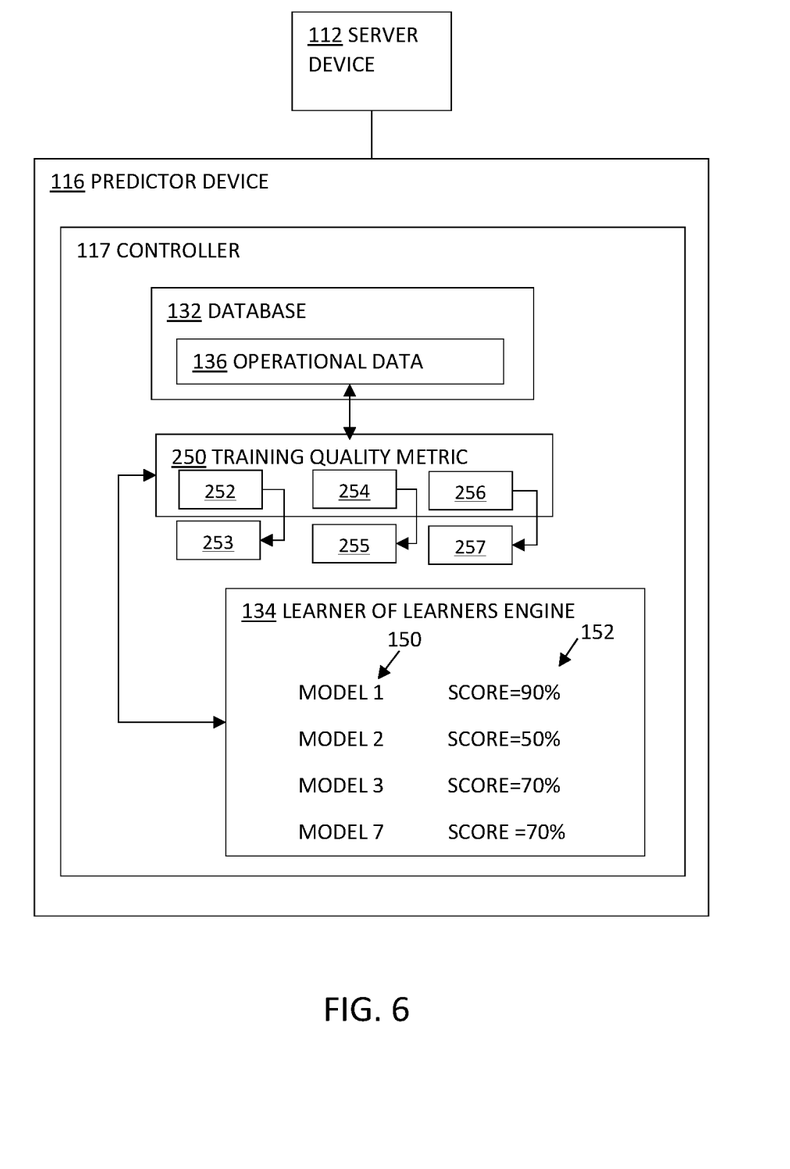
FIG. 6 illustrates a schematic representation of the predictor device of FIG. 2 configured to apply quality metrics to data models, according to one arrangement.

For example, following the generation of each model 150, the predictor device 116 is configured to apply the training quality metric 250 to the contact center operational data 136 and to each data model 150. In one arrangement, the training quality metric 250 can be configured as a function which quantifies the fit between a model 150 and a particular data set to the model 150. As such, by applying the training quality metric 250 to the contact center operational data 136 and to each data model 150, the predictor device 116 can identify the fit and can generate, as an output a score or model quality value 152 associated with each model 150.

The predictor device 116 can be configured to utilize a variety of types of training quality metric 250 to generate the model quality value 152 for each model 150 during the training process. The following provides several examples of the training quality metrics 250 utilized by the predictor device 116 during operation.

In one arrangement, during the training process, the predictor device 116 is configured to utilize a mean absolute error (MAE) metric 252 as the training quality metric 250. Mean absolute error relates to a measured difference between two variables. As such, during operation, the predictor device 116 can utilize each model 150 to identify the predicted output for a particular variable, such as EWT, and can utilize the contact center operational data 136 to identify the actual output value for a particular variable, such as EWT. The predictor device 116 can then apply the following MAE metric 252 to both the model 150 and the contact center operational data 136:

$$MAE = \frac{1}{n}\sum |y - \hat{y}|.$$

For each actual output value, y, of the contact center operational data 136, the predictor device 116 utilizes the MAE metric 252 to identify a magnitude of a residual, y−yˆ, where and yˆ is the predicted output value from the model 150. The MAE metric 252 utilizes the absolute value of the residual to mitigate the cancellation of negative and positive residual values. The predictor device 116 further utilizes the MAE metric 252 to calculate the average of the residual values, where n is the total number of data points within the contact center operational data 136. The predictor device 116 provides the average of the residual values as a mean error score 253 the given model 150. The predictor device 116 can output the mean error score 253 as the model quality value 152 for the model 150.

It is noted that each residual value contributes proportionally to the total amount of error calculated by the MAE metric 252 which means that larger errors will contribute linearly to the overall error. As a result, a relatively smaller model quality value 152 resulting from application of the MAE metric 252 suggests that a model 150 has a relatively high predictive accuracy. By contrast, a relatively larger model quality value 152 resulting from application of the MAE metric 252 suggests that the model 150 may have a lower predictive accuracy.

In one arrangement, during the training process, the predictor device 116 is configured to utilize an explained variance or variation (EV) metric 254 as the training quality metric 250. Generally, EV identifies the level to which a model can account for variation found within a set of data. In other words, the EV is indicative of a model's total variance that can explained by factors that are actually present and that are not caused by error variance.

With application of the EV metric 254 to the contact center operational data 136 and to each model 150, the predictor device 116 is configured to identify any discrepancy between the model 150 and the actual contact center operational data 136. For example, during application of the EV metric 254, the predictor device 116 can identify a coefficient of determination for the contact center operational data 136 relative to a given model 150. The predictor device 116 provides coefficient of determination as an explained variance score 255 for the given model 150. The predictor device 116 can output the explained variance score 255 as the model quality value 152 for the model 150.

The coefficient of determination indicates of the number of data elements of the contact center operational data 136 which fall within a regression line defined by a particular model 150. As such, the relatively higher the explained variance score 255, the greater the accuracy of the model 150. For example, a score of 1.0, while typically unlikely, identifies a 100% accuracy of the model 150 while a relative lower values suggests a lower level of accuracy of the model 150 (e.g., EV>=0.60 indicates that the model 150 is >60% accurate).

In one arrangement, during the training process, the predictor device 116 is configured to utilize a cross-validation metric 256 as the training quality metric 250. Generally, cross-validation relates to a technique which evaluates a predictive model by partitioning an original sample into a training set to train the model, and a test set to test the model. While the predictor device 116 can utilize a variety of cross-validation metric 256, in one arrangement, the predictor device 116 is configured to utilize a k-fold cross-validation metric 256, as described below.

With application of the k-fold cross-validation metric 256, the predictor device 116 randomly partitions the contact center operational data 136 into k equal size sub-samples. For example the predictor device 116 can divide the contact center operational data 136 into five equal subsets. Of these 5 subsets (k), the predictor device 116 retains a single subset as a validation data set to test each model 150. The predictor device 116 further retains each of the remaining 4 (k−1) subsets to train the model 150. With such partitioning, the predictor device 116 uses all of the observations within the contact center operational data 136 for both training and validation, and utilizes each observation for validation exactly once.

During operation, the predictor device 116 repeats the application of the cross-validation metric 256 to the model 150 k times (e.g., the folds), with each of the k subsets used exactly once as the validation data relative to the model 150. The predictor device 116 can then average or otherwise combine the k results to generate a single validation score 257 for the model 150. The predictor device 116 can output the validation score 257 as the model quality value 152 for the model 150.

As provided above, the predictor device 116 is configured to quantify the accuracy or quality for each model 150 of a set of models during training. As such, during the training process, the predictor device 116 can select a model 150 having an indication of the relatively highest quality, as evidenced by a score 152, as the best learning model 155 and can deploy that selected best learning model 155 to generate a contact center metric prediction 172, such as EWT. In one arrangement, the predictor device 116 is configured to monitor the quality of the best learner model 155 which has been deployed following training and is being used online.

Figure 7:
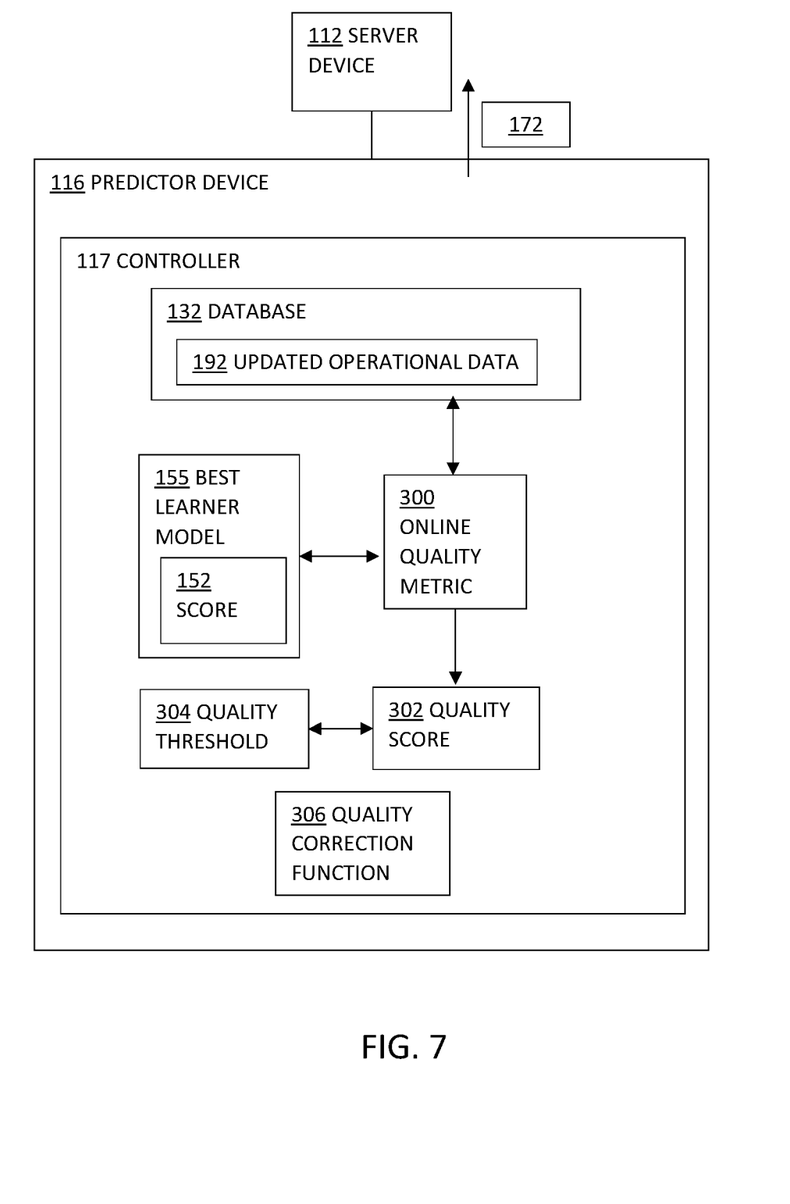
FIG. 7 illustrates a schematic representation of the predictor device of FIG. 1 configured to evaluate a quality score of the best learning model, according to one arrangement.

FIG. 7 illustrates a schematic representation of the predictor device 116 which is configured to evaluate the quality of a deployed best learning model 155 over time. In one arrangement, the predictor device 116 is configured to monitor performance and fitting (e.g., the quality) of the best learning model 155 by evaluating subsequently received training data (e.g., updated contact center operational data 192) against the best learning model 155.

For example, assume the case where the predictor device 116 has deployed a best learning model 155 having a quality score 152 of 90% to generate contact center metric predictions 172. As provided above, the predictor device 116 can also include a database 132 which stores contact center operational data 136 and updated contact center operational data 192 as retrieved by a monitor service 130 over time. With such a configuration, the predictor device 116 is configured to periodically evaluate the quality of the deployed best learning model 155 (i.e., the quality score 152) over time utilizing operational data stored by the database 132, such as the updated contact center operational data 192.

During the quality evaluation process, the predictor device 116 is configured to apply at least one on-line quality metric 300 to the updated contact center operational data 192 and to the best learning model 155 to generate a quality score 302 for the best learning model 155. While the on-line quality metric 300 can be configured in a variety of ways, in one arrangement, the on-line quality metric 300 can relate to the difference between a mean of the updated contact center operational data 192 (MoGT) and a mean of the data generated by the best learning model 155 (MoP) and can be given as the relationship |MoP−MoGT|. For example, in the case where MoP=5.601 and MoGT=5.598, the quality score 302 for the mean=0.003. In one arrangement, the on-line quality metric 300 can relate to the difference between the standard deviation of the updated contact center operational data 192 (StdGT) and the standard deviation of the data generated by the best learning model 155 (StdP) and can be given as the relationship |StdP−StdGT|. For example, in the case where StdP=20.817 and StdGT=18.262, the quality score 302 for the standard deviation=2.555. In one arrangement, the on-line quality metric 300 can relate to the difference between a maximum value (MaxGT) of the updated contact center operational data 192 (MaxGT) and a maximum value (MaxP) of the of the data generated by the best learning model 155 and can be given as the relationship |MaxP−MaxGT|. For example, in the case where MaxP=579.0 and MaxGT=612.3, the quality score 302 for the maximum value=33.3.

The predictor device 116 is then configured to compare the quality score 302 with a quality threshold 304. While the quality threshold 304 can be configured in a variety of ways, in one arrangement, the quality threshold 304 can relate to a ratio of the standard deviation of the updated contact center operational data 192 (StdGT) and mean of the updated contact center operational data 192 (MoGT) and can be given as the relationship (StdGT/MoGT). In one arrangement, the quality threshold 304 can relate to a multiple of the standard deviation of the updated contact center operational data 192 (StdGT) and can be given as the relationship 3 * StdGT. For the comparison, the predictor device 116 can be configured to compare the quality score 302 with the quality threshold 304 as follows:

$$|MoP-MoGT|<=(StdGT/MoGT)$$

$$|StdP-StdGT|<=(StdGT/MoGT)$$

$$|MaxP-MaxGT|<=3*StdGT.$$

In the case where the predictor device 116 identifies the quality score 302 as meeting the relationship with the quality threshold 304, as provided above, such identification indicates that the performance and fitting (e.g., the quality) of the best learning model 155 is adequate and no further action is necessary during this evaluation period. In the case where the predictor device 116 identifies the quality score 302 as falling outside of the quality threshold 304 (e.g., as failing to meet the relationship with the quality threshold 304), the predictor device 116 is configured to execute a quality correction function 306.

The quality correction function 306 can be configured in a variety of ways. For example, in the case where the predictor device 116 identifies the best learning model 155 as deviating from the subsequently received training data (e.g., updated contact center operational data 192), the predictor device 116 can execute the quality correction function 306 to causes a retraining and re-evaluation of the best learning model 155 with updated contact center operational data 192. In another example, execution of the quality correction function 306 can cause the predictor device 116 to provide a notification, such as an email notification, to a contact center operator identifying the discrepancy. In another example, execution of the quality correction function 306 can cause the predictor device 116 to select another model from the set of models 150 identified in FIG. 2 (e.g., a model 150 having the next largest score 152) and to deploy the newly selected model as the best learning model 155.

While various embodiments of the innovation have been particularly shown and described, it will be understood by those skilled in the art that various changes in form and details may be made therein without departing from the spirit and scope of the innovation as defined by the appended claims.

What is claimed is:

1. In a predictor device, a method for predicting a metric of a contact center, comprising:
receiving, by the predictor device, contact center operational data associated with a time duration;
training, by the predictor device, a set of algorithms and their available hyperparameters with the contact center operational data to generate a set of data models;
generating, by the predictor device, a score associated with each data model of the set of data models, the score quantifying a performance of each algorithm and its available hyperparameters on the contact center operational data;

identifying, by the predictor device, the data model having the largest score as a best learning model for the time duration; and generating, by the predictor device, a contact center metric prediction based on the best learning model for the time duration.

2. The method of claim 1, wherein generating the contact center metric prediction based on the best learning model for the time duration comprises:

receiving, by the predictor device, a prediction request, the prediction request including operating criteria which relate to the contact center;

applying, by the predictor device, the operating criteria to the best learning model for the time duration to generate the contact center metric prediction; and forwarding, by the predictor device, the contact center metric prediction to the contact center.

3. The method of claim 1, further comprising repeating the steps of:

receiving, by the predictor device, contact center operational data for a subsequent time duration;

training, by the predictor device, the set of algorithms and their available hyperparameters with the contact center operational data for the subsequent time duration to generate a set of subsequent data models;

generating, by the predictor device, a score associated with each subsequent data model of the set of subsequent data models, the score quantifying the performance of each algorithm and its available hyperparameters on the contact center operational data for the subsequent time duration; and identifying, by the predictor device, the subsequent data model having the largest score as the subsequent best learning model for the subsequent time duration.

4. The method of claim 1, wherein identifying the data model having the largest score as the best learning model, further comprises:

storing, by the predictor device, the best learning model as a pristine best learning model for the time duration in a best learner pristine portion of a best learner database; and storing, by the predictor device, the best learning model as a training best learning model for the time duration in a best learner training portion of the best learner database.

5. The method of claim 4, comprising:

receiving, by the predictor device, updated contact center operational data associated with the time duration;

accessing, by the predictor device, the best learner training portion of the best learner database;

partially training, by the predictor device, a most-recent best learning model stored within the best learner training portion of the best learner database on the updated contact center operational data;

partially training, by the predictor device, at least one subsequent best learning model stored within the best learner training portion of the best learner database on the updated contact center operational data;

weighing, by the predictor device, each trained best learning model with a corresponding pristine best learning model stored within the best learner pristine portion of the best learner database to generate the score for each trained best learning model.

6. The method of claim 5, comprising, in response to receiving contact center operation criteria, applying, by the predictor device, the trained best learning model having the highest score to the contact center operation criteria to generate the contact center metric prediction for the contact center.

7. The method of claim 1, wherein generating the score associated with each data model of the set of data models comprises:

applying, by the predictor device, at least one training quality metric to the contact center operational data and to each data model of the set of data models; and generating, by the predictor device, a model quality value for each data model of the set of data models based upon application of the at least one training quality metric.

8. The method of claim 7, wherein:

applying the at least one training quality metric to the contact center operational data and to each data model of the set of data models comprises applying, by the predictor device, a mean absolute error metric to the contact center operational data and to each data model of the set of data models; and generating the model quality value for each data model of the set of data models comprises generating, by the predictor device, a mean error score for each data model of the set of data models.

9. The method of claim 7, wherein:

applying the at least one training quality metric to the contact center operational data and to each data model of the set of data models comprises applying, by the predictor device, an explained variance metric to the contact center operational data and to each data model of the set of data models; and generating the model quality value for each data model of the set of data models comprises generating, by the predictor device, an explained variance score for each data model of the set of data models.

10. The method of claim 7, wherein:

applying the at least one training quality metric to the contact center operational data and to each data model of the set of data models comprises applying, by the predictor device, a cross-validation metric to the contact center operational data and to each data model of the set of data models; and generating the model quality value for each data model of the set of data models comprises generating, by the predictor device, a validation score for each data model of the set of data models.

11. The method of claim 1, further comprising:

applying, by the predictor device, at least one on-line quality metric to the contact center operational data and to the best learning model to generate a quality score for the best learning model; and when the quality score of the best learning model for the time duration falls outside of a quality threshold, executing, by the predictor device, a quality correction function.

12. A predictor device configured to predict a metric of a contact center, the predictor device comprising:

a controller having a processor and a memory, the controller configured to:

receive contact center operational data associated with a time duration;

train a set of algorithms and their available hyperparameters with the contact center operational data to generate a set of data models;

generate a score associated with each data model of the set of data models, the score quantifying a performance of each algorithm and its available hyperparameters on the contact center operational data;

identify the data model having the largest score as a best learning model for the time duration; and generate a contact center metric prediction based on the best learning model for the time duration.

13. The predictor device of claim 12, wherein when generating the contact center metric prediction based on the best learning model for the time duration the controller is configured to:

receive a prediction request, the prediction request including operating criteria which relate to the contact center;

apply the operating criteria to the best learning model for the time duration to generate the contact center metric prediction; and forward the contact center metric prediction to the contact center.

14. The predictor device of claim 12, wherein the controller is configured to further:

receive contact center operational data for a subsequent time duration;

train the set of algorithms and their available hyperparameters with the contact center operational data for the subsequent time duration to generate a set of subsequent data models;

generate a score associated with each subsequent data model of the set of subsequent data models, the score quantifying the performance of each algorithm and its available hyperparameters on the contact center operational data for the subsequent time duration; and identify the subsequent data model having the largest score as the subsequent best learning model for the subsequent time duration.

15. The predictor device of claim 12, wherein when identifying the data model having the largest score as the best learning model, the controller is further configured to:

store the best learning model as a pristine best learning model for the time duration in a best learner pristine portion of a best learner database; and store the best learning model as a training best learning model for the time duration in a best learner training portion of the best learner database.

16. The predictor device of claim 15, wherein the controller is configured to:

receive updated contact center operational data associated with the time duration;

access the best learner training portion of the best learner database;

partially train a most-recent best learning model stored within the best learner training portion of the best learner database on the updated contact center operational data;

partially train at least one subsequent best learning model stored within the best learner training portion of the best learner database on the updated contact center operational data;

weigh each trained best learning model with a corresponding pristine best learning model stored within the best learner pristine portion of the best learner database to generate the score for each trained best learning model.

17. The predictor device of claim 16, wherein, in response to receiving contact center operation criteria, the controller is configured to apply the trained best learning model having the highest score to the contact center operation criteria to generate the contact center metric prediction for the contact center.

18. The predictor device of claim 12, wherein when generating the score associated with each data model of the set of data models, the controller is configured to:

apply at least one training quality metric to the contact center operational data and to each data model of the set of data models; and generate a model quality value for each data model of the set of data models based upon application of the at least one training quality metric.

19. The predictor device of claim 18, wherein:

when applying the at least one training quality metric to the contact center operational data and to each data model of the set of data models, the controller is configured to apply a mean absolute error metric to the contact center operational data and to each data model of the set of data models; and when generating the model quality value for each data model of the set of data models, the controller is configured to generate a mean error score for each data model of the set of data models.

20. The predictor device of claim 18, wherein:

when applying the at least one training quality metric to the contact center operational data and to each data model of the set of data models the controller is configured to apply an explained variance metric to the contact center operational data and to each data model of the set of data models; and when generating the model quality value for each data model of the set of data models the controller is configured to generate an explained variance score for each data model of the set of data models.

21. The predictor device of claim 18, wherein:

when applying the at least one training quality metric to the contact center operational data and to each data model of the set of data models the controller is configured to apply a cross-validation metric to the contact center operational data and to each data model of the set of data models; and when generating the model quality value for each data model of the set of data models the controller is configured to generate a validation score for each data model of the set of data models.

22. The predictor device of claim 13, wherein the controller is further configured to:

apply at least one on-line quality metric to the contact center operational data and to the best learning model to generate a quality score for the best learning model; and when the quality score of the best learning model for the time duration falls outside of a quality threshold, execute a quality correction function.

* * * * *